United States Patent
Tiprigan et al.

(12) 
(10) Patent No.: US 12,092,107 B2
(45) Date of Patent: Sep. 17, 2024

(54) DUAL INPUT PUMP ASSEMBLY

(71) Applicant: Bell Textron Inc., Fort Worth, TX (US)

(72) Inventors: Ezra Mike Tiprigan, North Richland Hills, TX (US); Charles Hubert Speller, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 281 days.

(21) Appl. No.: 17/168,057

(22) Filed: Feb. 4, 2021

(65) Prior Publication Data
US 2022/0243726 A1    Aug. 4, 2022

(51) Int. Cl.
| | | |
|---|---|---|
| F04C 2/10 | (2006.01) | |
| B64C 29/00 | (2006.01) | |
| F01M 1/02 | (2006.01) | |

(52) U.S. Cl.
CPC .............. F04C 2/102 (2013.01); F01M 1/02 (2013.01); B64C 29/0033 (2013.01); F01M 2001/0238 (2013.01); F01M 2001/0284 (2013.01)

(58) Field of Classification Search
CPC .. F04C 2/102; F01M 1/02; F01M 2001/0238; F01M 2001/0284; B64C 29/0033
See application file for complete search history.

(56) References Cited

FOREIGN PATENT DOCUMENTS

WO    WO-2015118271 A1 *    8/2015    ............. F01D 25/20

OTHER PUBLICATIONS

Machine Translation of WO2015118271A1 PDF File Name: "WO2015118271A1_Machine_Translation.pdf".*

* cited by examiner

Primary Examiner — Grant Moubry
Assistant Examiner — Ruben Picon-Feliciano
(74) Attorney, Agent, or Firm — Lightfoot & Alford PLLC

(57) ABSTRACT

A pump assembly, comprising a pump and housing having an inlet passage and an outlet passage. The pump includes inlet and outlet ports and opposing first and second drive inputs configured to be rotated together in a pumping direction to operate the pump. The pump can be installed in the housing in a first orientation, in which the first drive input is configured for being rotated by a drive source in a first external direction to operate the pump, and a second orientation, in which the second drive input is configured for being rotated by the drive source in a second external direction opposite of the first external direction to operate the pump. In both the first orientation and the second orientation, the inlet port is in fluid communication with the inlet passage and the outlet port is in fluid communication with the outlet passage.

12 Claims, 5 Drawing Sheets

DUAL INPUT PUMP ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND

Multirotor aircraft incorporate at least two rotors to provide thrust. For multirotor aircraft with two rotors, the two rotors typically rotate in opposite directions of each other so that each rotor cancels torque applied to the aircraft by the other rotor. The two rotors can be essentially identical to each other besides the direction in which the rotors rotate. Each rotor may be powered by a powerplant and transmission that operate in the same or opposite rotation direction of the rotor, and each transmission may include a gearbox with an oil pump that circulates lubricating oil throughout the gearbox. Each oil pump may be operated by a drive source of its gearbox that rotates in the operation direction of the gearbox. Accordingly, in prior designs, the same oil pump cannot be used on both gearboxes of a multirotor aircraft, as the operational rotation direction of each oil pump corresponds to the operational rotation direction of the associated gearbox. This requires the gearbox that has a rotation direction opposite of the rotation direction of the oil pump to incorporate means for reversing the drive rotation, such as an additional idler gear, so that the oil pump can be compatible with the rotation direction of the gearbox, adding additional components and cost. While there are oil pumps that are designed to be driven in both rotation directions, the pumps may require complicated disassembly and rearrangement in order to change the operational rotation direction of the pump. Additionally, pumps that can be driven in both rotational directions may be less efficient than pumps driven in one rotational direction.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The disclosure provides a pump assembly that can be operated by being driven in the same internal rotation direction but in opposite external rotation directions that vary based on the installation orientation of the pump within a housing. In a first installation orientation, a first drive input of the pump assembly is configured for rotation by a drive source in the first external rotation direction and, in a second installation orientation, an opposing second drive input of the pump assembly is configured for rotation by the drive source in a second external rotation direction.

Figure 1:
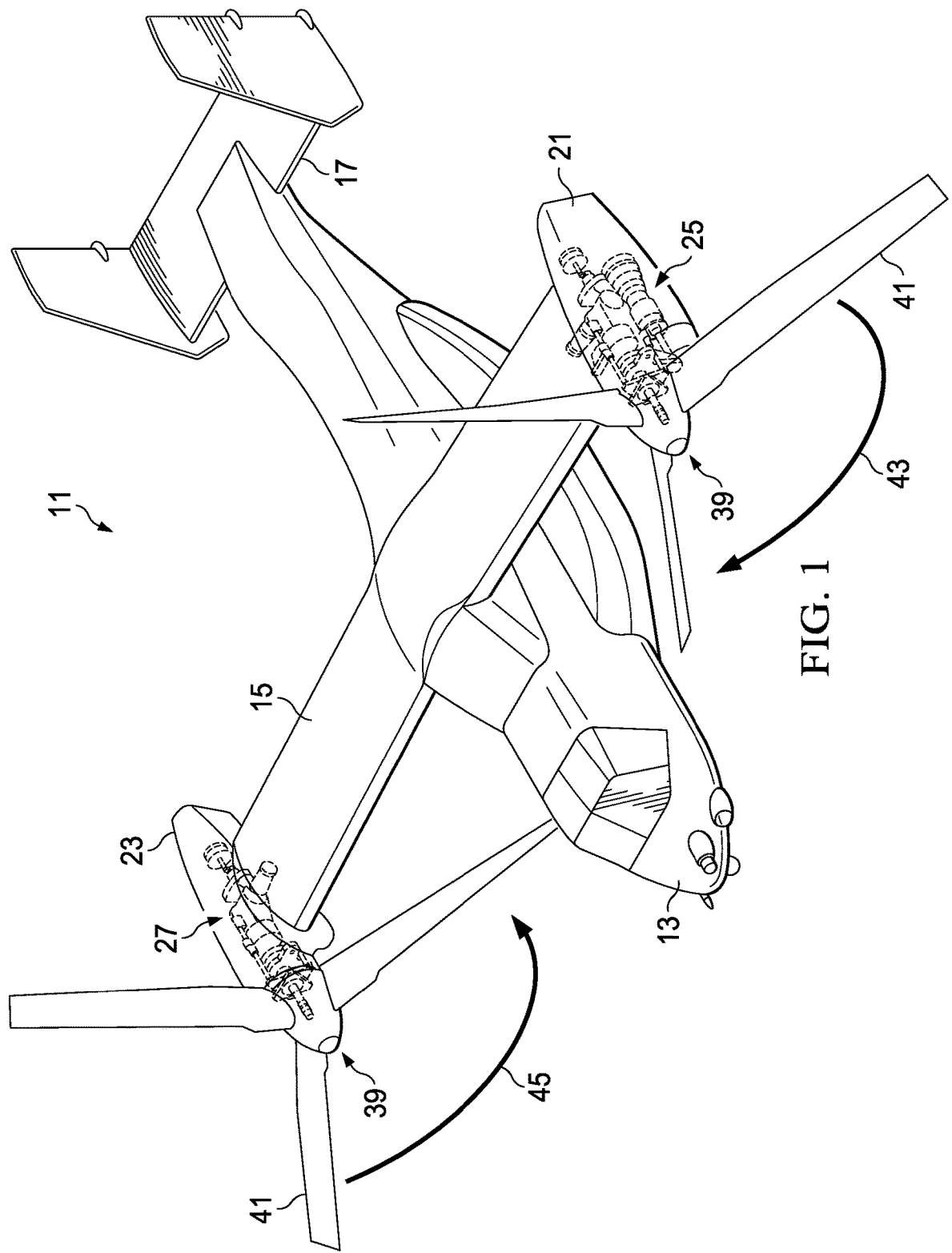
FIG. 1 illustrates an oblique view of a multirotor aircraft according to this disclosure.
Figure 2:
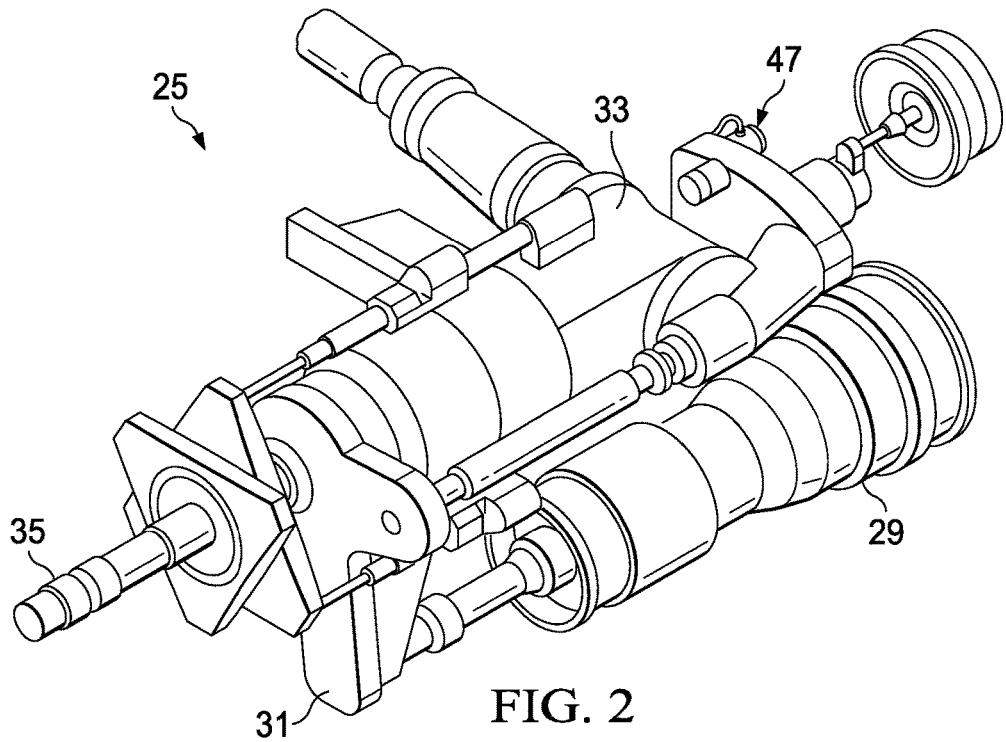
FIG. 2 illustrates an oblique view of a propulsion assembly of a multirotor aircraft according to this disclosure.

Referring to FIGS. 1 and 2, aircraft 11 comprises fuselage 13, wing 15, and tail section 17. Nacelles 21, 23 are each pivotally mounted on opposing sides of fuselage 13 and, in this embodiment, on opposing ends of wing 15. Nacelle 21 houses propulsion assembly 25, and nacelle 23 houses propulsion assembly 27, each propulsion assembly 25, 27 comprising an engine 29, a gearbox 31, and a transmission 33. Gearbox 31 is configured for transferring torque from the associated engine 29 to a mast 35 for rotating an attached proprotor 39, each proprotor 39 being an assembly having multiple blades 41. Each nacelle 21, 23 is pivotable relative to wing 15 for selectively moving propulsion assemblies 25, 27 and proprotors 39 between a vertical orientation in helicopter mode and a horizontal orientation in airplane mode. All propulsion assemblies 25, 27 according to this disclosure may alternatively be configured with electric motors to produce torque for driving proprotors 39.

Propulsion assemblies 25 and 27 are configured to rotate in opposite directions so that torque applied to aircraft 11 from one propulsion assembly 25, 27 is canceled by the torque applied to aircraft 11 by the other propulsion assembly 25, 27. As illustrated in FIG. 1, propulsion assembly 25 operates in a first external direction 43 and propulsion assembly 27 operates in a second external direction 45. Although aircraft 11 is illustrated as having two propulsion assemblies 25, 27, in various embodiments aircraft 11 has more than two propulsion assemblies. Gearbox 31 includes an oil pump assembly 47 for circulating lubricating oil throughout a lubrication system of gearbox 31.

Figure 3:
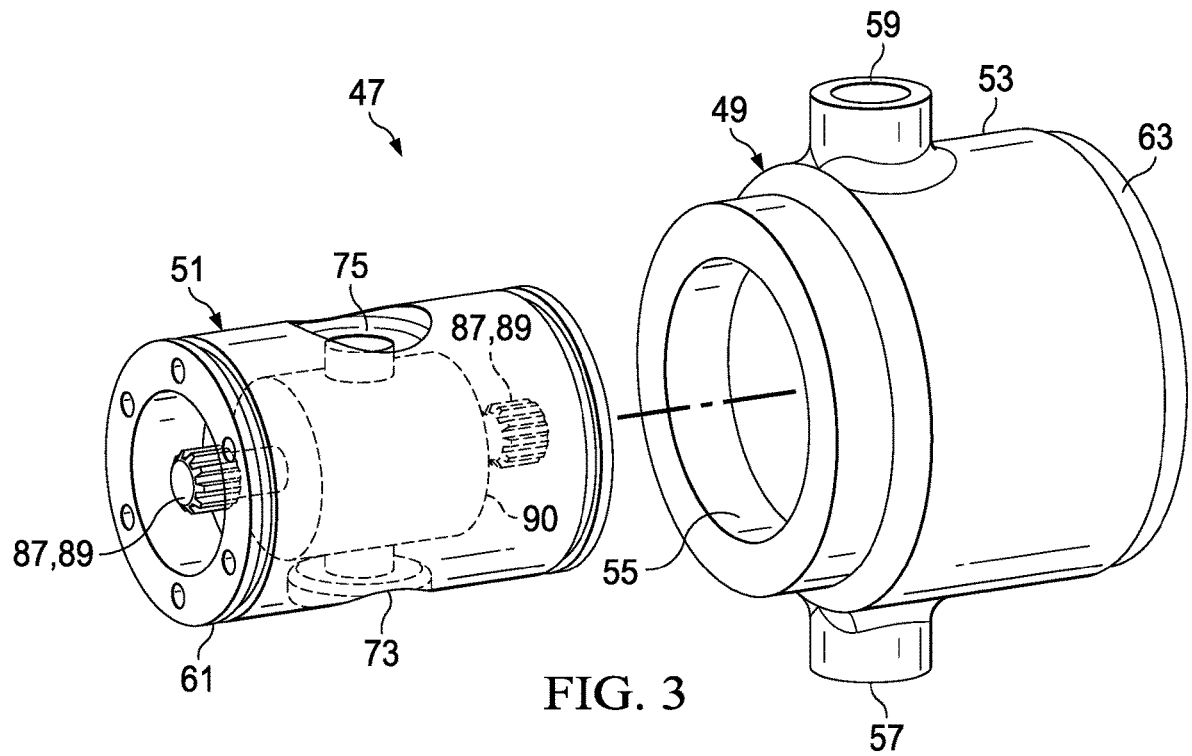
FIG. 3 illustrates an exploded view of a pump assembly according to this disclosure and configured for use on the propulsion assembly of FIG. 2.
Figure 4:
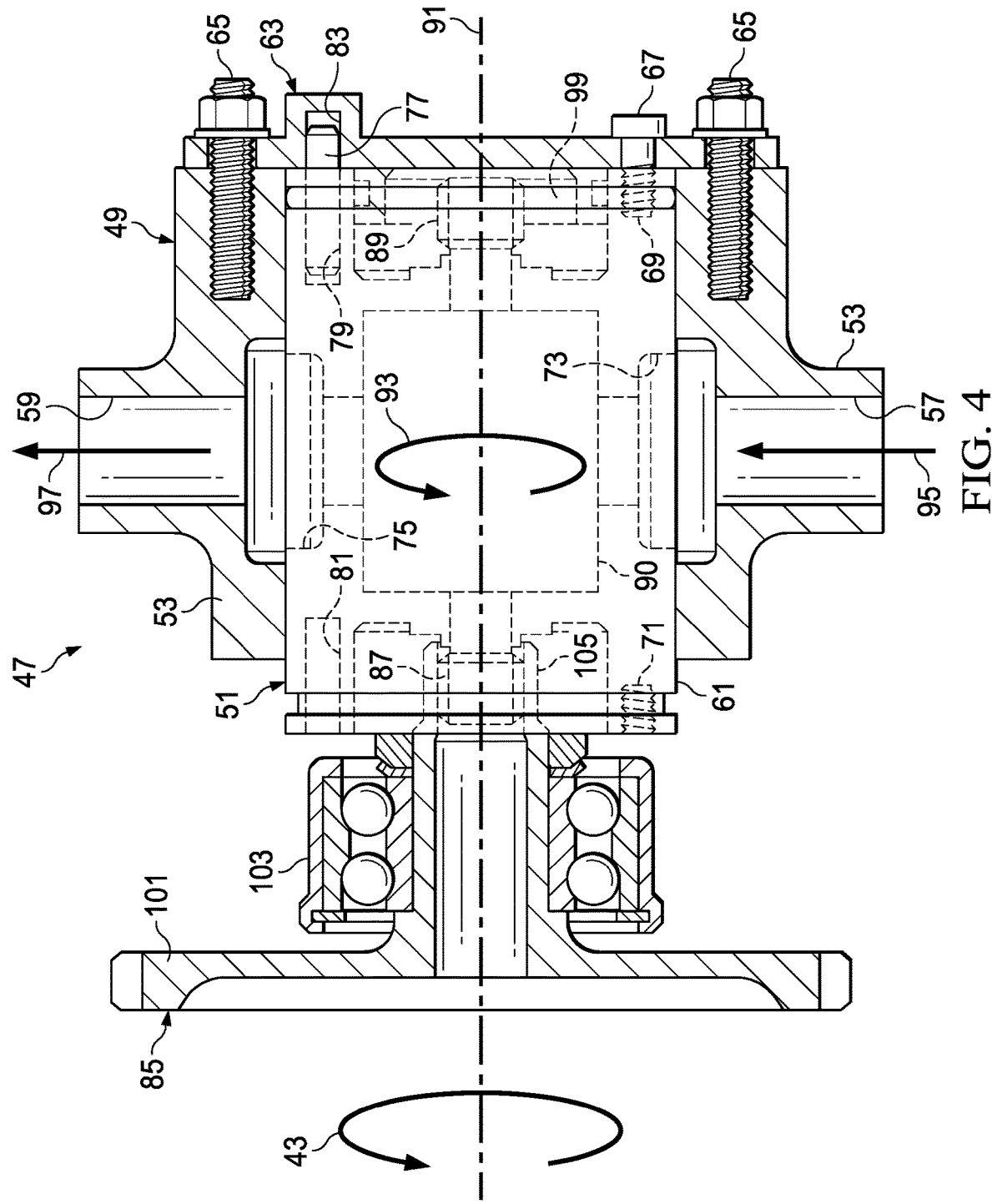
FIG. 4 illustrates a cross-sectional view of the pump assembly of FIG. 3 in a first orientation position.
Figure 5:
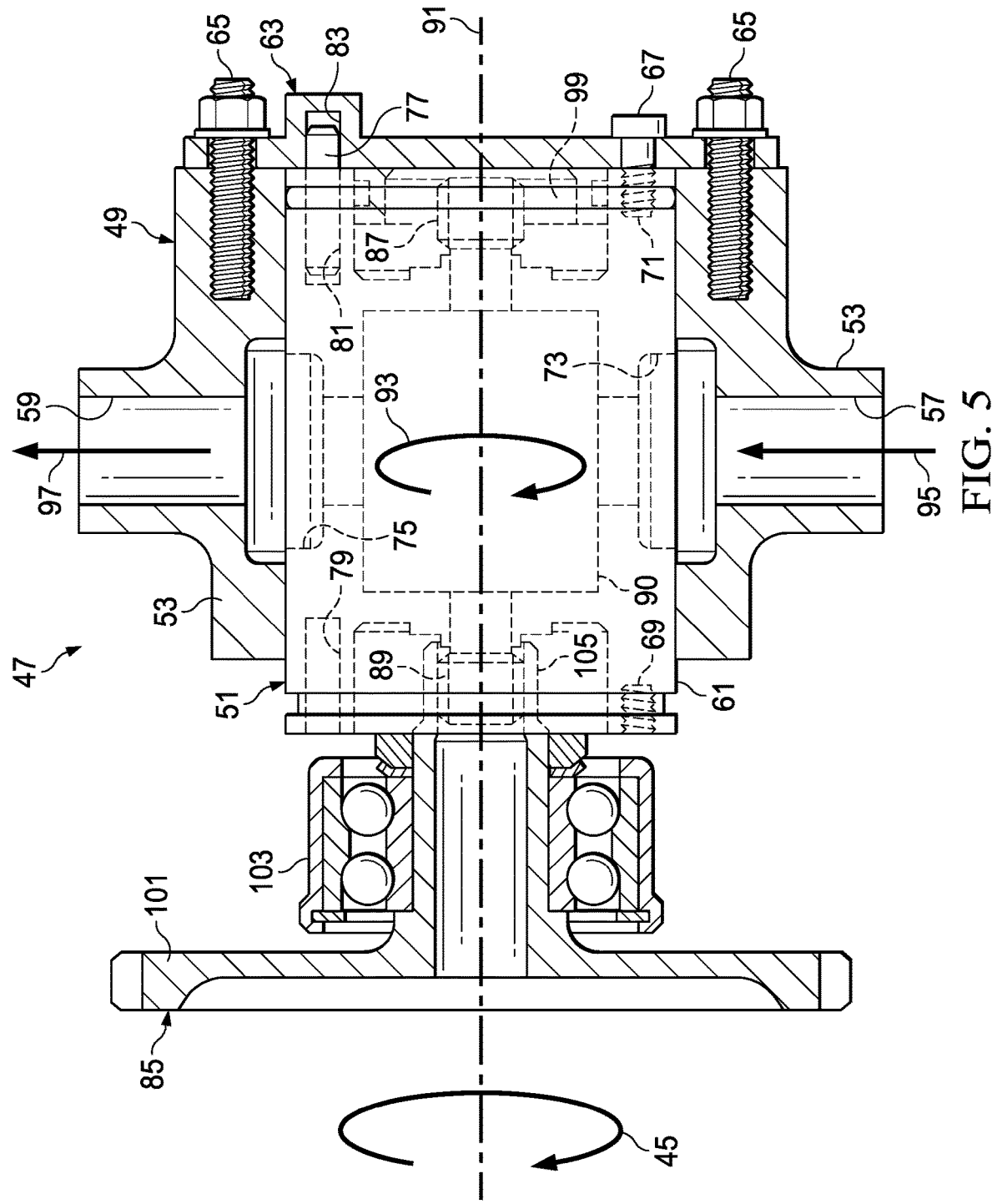
FIG. 5 illustrates a cross-sectional view of the pump assembly of FIG. 3 in a second orientation position.

Referring to FIGS. 3-5, pump assembly 47 includes a pump housing 49 and a pump 51. Housing 49 includes a generally cylindrically shaped body 53 with an aperture 55 in which cylindrically shaped pump 51 is installed. Body 53 includes an inlet passage 57 through which liquid is supplied to pump 51 and an outlet passage 59 through which pump 51 discharges liquid. Though shown as slightly elongated, passages 57, 59 may be apertures or ports formed in body 53 or may be elongated tubes.

According to some embodiments, a casing 61 of pump 51 is coupled to body 53. However, as illustrated in the Figures, in some embodiments, pump 51 is installed on an end cap 63 of housing 49. In some embodiments, end cap 63 is a blind flange upon which pump 51 and body 53 are mounted. Body fasteners 65 are configured to fasten end cap 63 to body 53. Although there are two body fasteners 65 illustrated, in some embodiments there are more than two body fasteners 65 that fix end cap 63 to body 53.

Pump 51 can be installed in housing 49 in a first orientation position illustrated in FIG. 4 and in a second orientation position illustrated in FIG. 5. A pump fastener 67 is configured to fasten pump 51 to end cap 63. Pump 51 has a first fastener hole 69 and a second fastener hole 71 each formed in casing 61 and configured to receive pump fastener 67. When pump 51 is in the first orientation position, fastener 67 is fastened to hole 69. When pump 51 is in the second orientation, fastener 67 is fastened to hole 71. There are various embodiments in which multiple pump fasteners 67 and corresponding holes 69, 71 are used to fix pump 51 to end cap 63.

Pump 51 has an inlet port 73 aligned with inlet passage 57 and an outlet port 75 aligned with outlet passage 59. A dowel pin 77 is used to align ports 73, 75 with corresponding passages 57, 59. Pump 51 has a first dowel pin hole 79 and a second dowel pin hole 81 formed in casing 61. When pump 51 is in the first orientation position, dowel pin 77 aligns an end cap dowl pin hole 83 with first dowel pin hole 79. When pump 51 is in the second orientation position, dowel pin 77 aligns end cap dowel pin hole 83 with second dowel pin hole 81. Although there is one dowel pin 77 illustrated, in some embodiments there are more than one dowel pin 77.

In the embodiment shown, pump 51 is a rotary pump configured to transfer a liquid, though pump 51 is not limited to transferring any one certain type of liquid. According to a preferred embodiment, pump 51 is configured to transfer a lubricating oil. Pump 51 is a rotary pump configured to transfer liquid based on being driven by a rotational force and, in a preferred embodiment, is a gerotor pump.

Pump 51 is coupled to and driven by a drive source 85 configured to deliver a rotational force, or a torque, to a first drive input 87 and a second drive input 89 of pump 51. In some embodiments, drive source 85 is part of aircraft gearbox 31 lubrication system that rotates in the external direction 43, 45 of the gearbox 31. Thus, the oil pump drive source 85 in propulsion assembly 25 rotates in first external direction 43 and oil pump drive source 85 in propulsion assembly 27 rotates in second external direction 45. In some embodiments, drive source 85 is a drive source of a different lubrication system of aircraft 11. In some embodiments, drive source 85 is an electric motor of aircraft 11. Drive source 85 can be any suitable drive source of aircraft 11 for transferring rotational force, or torque, to pump 51.

Drive inputs 87, 89 are coupled for rotation together about an axis 91 and cause a pumping mechanism 90 to pump fluid when either input 87, 89 is rotated in the associated direction 43, 45. As shown in the drawings, rotation of pumping mechanism 90 in selected internal rotation direction 93 causes fluid to flow in flow direction 95 from inlet passage 57 into inlet port 73 and in flow direction 97 out of outlet port 75 and through outlet passage 59. Rotation of first input 87 in external direction 43 while pump 51 is in the first installation orientation shown in FIG. 4 causes rotation of pumping mechanism 90 in internal direction 93, thereby causing flow in directions 95, 97. Likewise, rotation of input 89 in external direction 45 while pump 51 is in the second installation orientation shown in FIG. 5 also causes rotation of pumping mechanism 90 in internal direction 93, thereby also causing flow in directions 95, 97.

Drive inputs 87 and 89 are coupled to each other such that when one of the drive inputs 87, 89 is rotated by drive source 85, the other drive input 87, 89 is rotated in the same direction. Accordingly, when drive source 85 is coupled to first drive input 87 and causes first drive input 87 to rotate in internal direction 93 by rotating in external direction 43, second drive input 89 is also rotated in internal direction 93 in unison with drive input 87 due to second drive input 89 being coupled to first drive input 87. Likewise, when drive source 85 is coupled to second drive input 89 and causes second drive input 89 to rotate in internal direction 93 by rotating in external direction 45, first drive input 87 is also rotated in internal direction 93 in unison with drive input 89 due to first drive input 87 being coupled to second drive input 89.

Internal direction 93 of pump 51 remains the same direction relative to pump 51 regardless of whether pump 51 is in the first orientation position or the second orientation position. Based on the described interaction of the drive inputs 87, 89, internal rotation direction 93 may be the same as the first external direction 43 or the second external direction 45 depending on whether pump 51 is in the first orientation position or the second orientation position.

In both the first and second orientation positions, volume 99 is formed between pump casing 61 and end cap 63. As illustrated in FIGS. 4 and 5, either first drive input 87 or second drive input 89 is disposed in space 99 depending on whether pump 51 is in the first orientation position or the second orientation position. In the first orientation, drive input 89 is disposed in space 99 and can rotate freely in space 99 when drive input 87 is rotated by drive source 85. Likewise, in the second orientation, drive input 87 is disposed in space 99 and can rotate freely in space 99 when second drive input 89 is rotated by drive source 85. Space 99 allows drive inputs 87, 89 to rotate freely while still being enclosed within housing 49. If drive inputs 87, 89 were exposed to an exterior of housing 49 when not coupled to drive source 85, drive inputs 87, 89 could come into contact with nearby components of propulsion assemblies 25, 27 and damage the nearby components or pump 51. Additionally, having a rotating drive input 87, 89 exposed to the exterior of housing 49 could be a safety issue, as the rotating input could cause harm to a person working on or near pump assembly 47.

The drive source 85 has a rotating member 101 rotatably supported by a bearing assembly 103 of gearbox 31. Rotating member 101 is configured to rotate in first external direction 43 and second external direction 45. Rotating member 101 is configured to be coupled to drive inputs 87, 89 to provide rotational force to drive inputs 87, 89. Specifically, rotating member 101 includes a fitting 105 configured to couple to drive inputs 87, 89. As illustrated in FIGS. 4 and 5, fitting 105 accepts the drive input 87, 89 into an interior of fitting 105.

Figure 6:
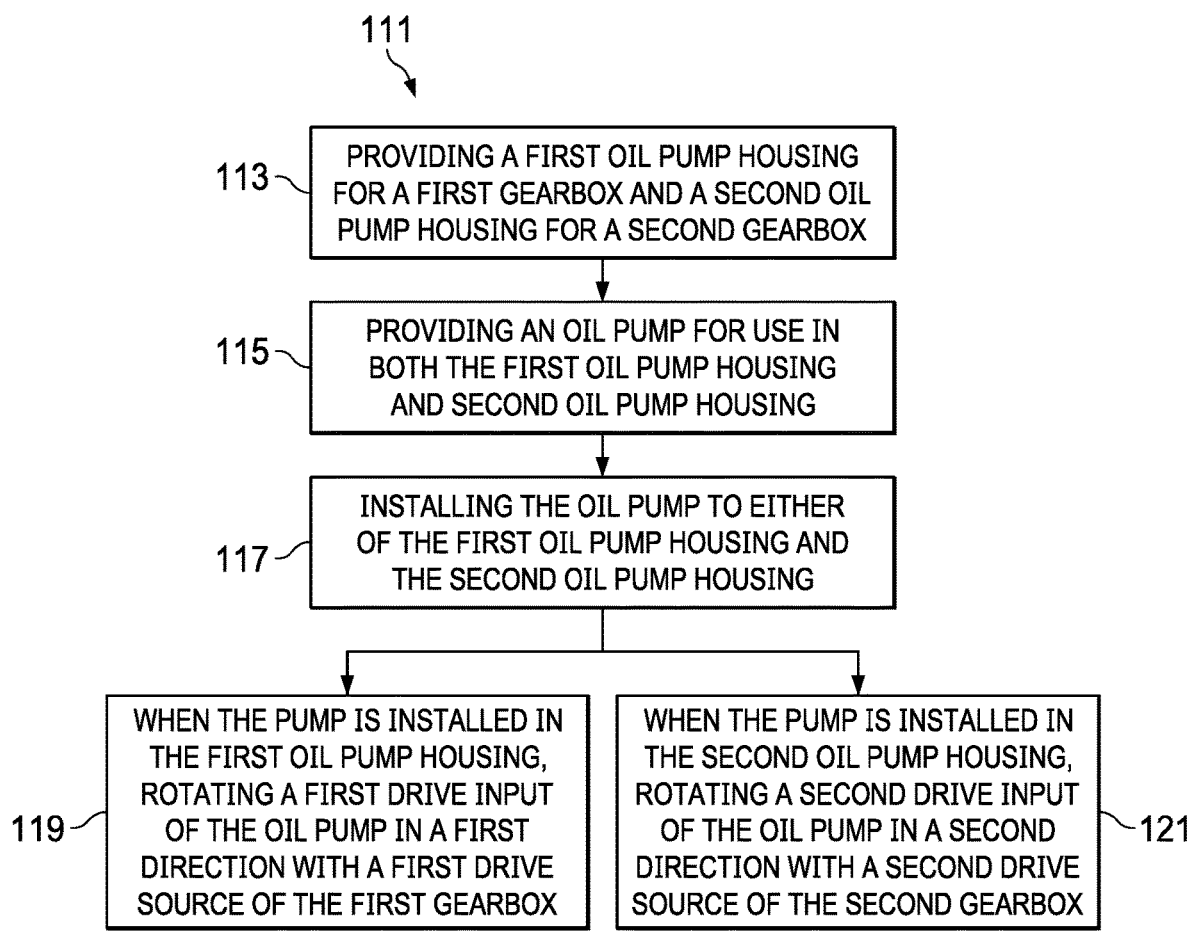
FIG. 6 illustrates a flowchart of a method according to this disclosure of operating a pump.

Referring to FIG. 6, hereinafter, a method 111 of operating pump 51 will be described. In operation 113, for each propulsion assembly 25, 27, gearbox 31 is provided with pump housing 49. In operation 115, pump 51 is provided for use in housing 49 in propulsion assembly 25 in the first orientation position and in housing 49 of propulsion assembly 27 in the second orientation position. In operation 117, pump 51 is installed in either housing 49 of propulsion assembly 25 or housing 49 of propulsion assembly 27. When pump 51 is installed in housing 49 of propulsion assembly 25, pump 51 is installed in housing 49 in the first orientation position. When pump 51 is installed in housing 49 of propulsion assembly 27, pump 51 is installed in housing 49 in the second orientation position. In operation 119, when pump 51 is installed in propulsion assembly 25, first drive input 87 is coupled to drive source 85 of gearbox 31 and is rotated by drive source 85 in first external direction 43 so that first drive input 87 is driven in internal direction 93. In operation 121, when pump 51 is installed in propulsion assembly 27, second drive input 89 is coupled to drive source 85 of gearbox 31 and is rotated by drive source 85 in second rotation direction 45 so that second drive input 89 is driven in internal rotation direction 93.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.4, 0.12, 0.13, etc.). For example, whenever a numerical range with a lower limit, $R^l$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 11 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 11 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A pump assembly, comprising:
   a housing including an inlet passage and an outlet passage; and
   a pump, including:
   an inlet port and an outlet port; and
   a first drive input and an opposing coaxial second drive input, the drive inputs configured to be rotated together in a pumping direction to operate the pump for causing fluid flow from the inlet port to the outlet port;
   wherein the pump is disposed in the housing in:
   a first orientation, in which the first drive input is exposed to an exterior of the housing and engages a drive source, which rotates the first input in a first external direction for causing the pump to rotate in the pumping direction; or
   a second orientation, in which the second drive input is exposed to an exterior of the housing and engages the drive source, which rotates the second input in a second external direction opposite of the first external direction for causing the pump to rotate in the pumping direction;
   wherein, when the pump is in either of the first orientation or the second orientation, the inlet port is in fluid communication with the inlet passage and the outlet port is in fluid communication with the outlet passage.

2. The pump assembly of claim 1, wherein the housing further includes a cylindrical aperture in which the pump is installed.

3. The pump assembly of claim 1, wherein the housing further includes an end cap coupled to the housing.

4. The pump assembly of claim 1, wherein:
   the housing further includes an aperture formed through the housing and an end cap disposed on an end of the aperture; and
   the aperture is sized for receiving the pump.

5. The pump assembly of claim 4, wherein, when the pump is inserted into the aperture, either of the first drive input or the second drive input is disposed within a volume formed between the end cap and the pump.

6. The pump assembly of claim 1, wherein the pump is a gerotor pump.

7. The pump assembly of claim 1, wherein the inlet port and the outlet port oppose each other.

8. An aircraft, comprising:
   a first oil pump drive source that rotates in a first external direction and a second oil pump drive source that rotates in a second external direction opposite of the first external direction;
   first and second oil pump housings corresponding to the first and second oil pump drive sources, respectively, each of the first and second oil pump housings including an inlet passage and an outlet passage; and
   a pump configured for use in either of the first and second oil pump housings, the pump including:
   an inlet port and an outlet port; and
   a first drive input and an opposing coaxial second drive input, the drive inputs configured to be rotated together in a pumping direction to operate the pump for causing fluid flow from the inlet port to the outlet port;
   wherein the pump is disposed in:
   the first oil pump housing in a first orientation in which the first drive input is exposed to an exterior of the first oil pump housing and is rotated by the first oil pump drive source; or
   the second oil pump housing in a second orientation in which the second drive input is exposed to an exterior of the second oil pump housing and is rotated by the second oil pump drive source;
   wherein, when the pump is installed in either the first oil pump housing or the second oil pump housing, the inlet port is in fluid communication with the corresponding inlet passage and the outlet port is in fluid communication with the corresponding outlet passage.

9. The aircraft of claim 8, wherein each of the first oil pump housing and second oil pump housing includes a body with a cylindrical aperture in which the pump is installed.

10. The aircraft of claim 8, wherein each of the first oil pump housing and the second oil pump housing further includes an end cap coupled to the oil pump housing.

11. The aircraft of claim 8, wherein the inlet port and the outlet port oppose each other.

12. The aircraft of claim 8, wherein the pump is a gerotor pump.

* * * * *